(12) United States Patent
Boone et al.

(10) Patent No.: US 8,479,975 B2
(45) Date of Patent: Jul. 9, 2013

(54) SYSTEM AND METHOD FOR USING MACHINE-READABLE INDICIA TO PROVIDE ADDITIONAL INFORMATION AND OFFERS TO POTENTIAL CUSTOMERS

(75) Inventors: Christopher Boone, San Francisco, CA (US); Youriy Drozd, Fremont, CA (US); Florian Brody, Santa Clara, CA (US); Leonid Kontsevich, San Francisco, CA (US)

(73) Assignee: Cimbal Inc., Los Altos, CA (US)

( * ) Notice: Subject to any disclaimer, the term of this patent is extended or adjusted under 35 U.S.C. 154(b) by 111 days.

(21) Appl. No.: 12/931,788

(22) Filed: Feb. 10, 2011
(Under 37 CFR 1.47)

(65) Prior Publication Data
US 2012/0037697 A1    Feb. 16, 2012

Related U.S. Application Data

(60) Provisional application No. 61/303,313, filed on Feb. 11, 2010.

(51) Int. Cl.
*G06F 17/00* (2006.01)

(52) U.S. Cl.
USPC ......................................................... 235/375

(58) Field of Classification Search
USPC .......................... 235/375, 383; 705/7.29, 7.34
See application file for complete search history.

(56) References Cited

U.S. PATENT DOCUMENTS

| | | | | |
|---|---|---|---|---|
| 6,512,919 | B2 * | 1/2003 | Ogasawara | 455/422.1 |
| 7,156,311 | B2 * | 1/2007 | Attia et al. | 235/462.46 |
| 2002/0002504 | A1 * | 1/2002 | Engel et al. | 705/26 |
| 2005/0198095 | A1 * | 9/2005 | Du et al. | 709/200 |

* cited by examiner

*Primary Examiner* — Seung Lee
(74) *Attorney, Agent, or Firm* — Brian R. Galvin; Galvin Patent Law LLC (57) ABSTRACT

A system for using machine-readable indicia to provide additional information and offers to potential customers, the system comprising a network-connected server adapted to receive coded information from mobile devices, a database coupled to the server and containing data pertaining to products, a software application executing on the server for processing the coded information, and a plurality of labels containing machine-readable indicia and posted near products for sale, is disclosed. According to the invention, on receiving coded information from a mobile device, the server provides the data to the software application, and the software application determines from the coded information a location from which the information was obtained and a product to which the information pertains, and, based at least in part on the location and product information obtained, the application obtains additional data from the database and sends it to the mobile device from which the coded information was received.

14 Claims, 6 Drawing Sheets

Fig. 6

SYSTEM AND METHOD FOR USING MACHINE-READABLE INDICIA TO PROVIDE ADDITIONAL INFORMATION AND OFFERS TO POTENTIAL CUSTOMERS

CROSS-REFERENCE TO RELATED APPLICATIONS

This application claims the benefit of U.S. Provisional Patent Application Ser. No. 61/303,313 on Feb. 11, 2010, which is entirely incorporated herein by reference.

BACKGROUND OF THE INVENTION

The invention is in the field of mobile computing applications, and more particularly in the field of mobile commerce applications enabling merchants to exchange valuable information with retail consumers.

Many retail stores maintain valuable online resources, where one can find descriptions and specifications of the merchandise, reviews, and ratings. To facilitate sales the stores are interested in providing such information to their visitors while they are in the store.

This goal can be achieved with web-enabled mobile devices, such as smart phones with embedded cameras. A merchant application provides software, which can read optical codes, 1-D or 2-D barcodes for example, associated with the merchandise by the merchant or manufacturer, and then convert the code into a URL or similar link to information on the merchant website, for example. Such optical code and information retrieval methodology would be a working solution for a single merchant. In reality, there are many merchants, each with different coding conventions, and a customer would need to download and manage multiple custom merchant applications, which is cumbersome and inconvenient.

SUMMARY OF THE INVENTION

According to a preferred embodiment of the invention, a system for using machine-readable indicia to provide additional information and offers to potential customers, the system comprising a network-connected server adapted to receive coded information from mobile devices, a database coupled to the server and containing data pertaining to products, a software application executing on the server for processing the coded information, and a plurality of labels containing machine-readable indicia and posted near products for sale, is disclosed. According to the invention, on receiving coded information from a mobile device, the server provides the data to the software application, and the software application determines from the coded information a location from which the information was obtained and a product to which the information pertains, and, based at least in part on the location and product information obtained, the application obtains additional data from the database and sends it to the mobile device from which the coded information was received.

According to another preferred embodiment of the invention, A machine-readable code, on a storage medium, or downloadable over a network connection, to be installed on a mobile computing device, said device having a user display, a camera, non-volatile storage, location information and a network connection, is disclosed, wherein, upon the detecting a suitable machine readable indicia, the device calculates an indicator based on said indicia, and the device uses said indicator to obtain data relevant to an object related to said machine-readable indicia, and then displays part or all of said data relevant to an object related to said machine-readable indicia.

According to another preferred embodiment of the invention, a method for providing information to a user is disclosed, the method comprising the steps of (a) taking a picture, with a mobile device having a display, a camera and a network interface, of a machine-readable indicia, (b) calculating from the machine-readable indicia an indicator, and (c) using the indicator to retrieve relevant data and at least display part of that data to a user.

DESCRIPTION OF THE EMBODIMENT

What is needed is a system and method that can contextualize a scanned bar code or other suitable machine readable data with additional information, such as location, merchant, etc., and provide additional detail and prices, etc., as well as rebates or other promotional material to a potential buyer.

Figure 1:
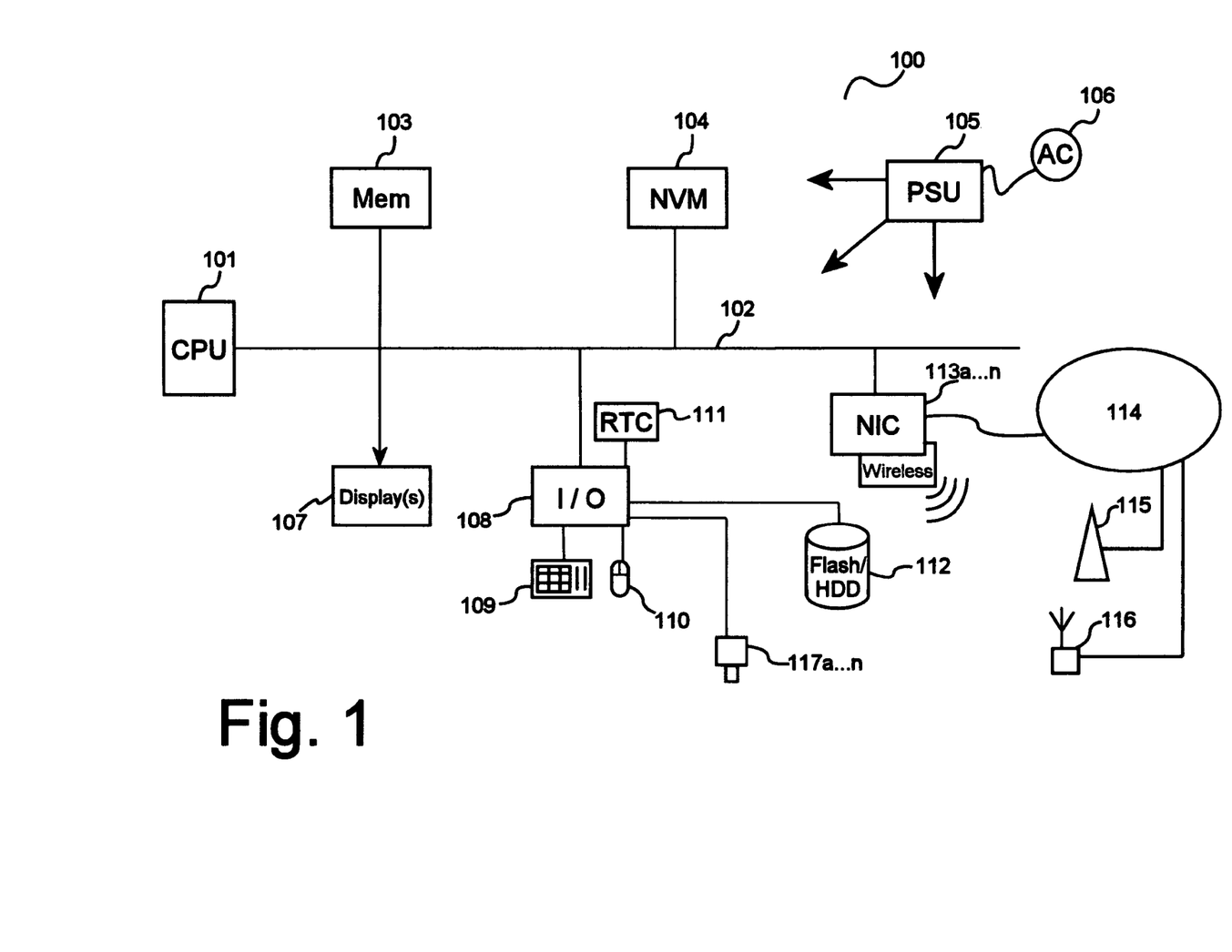
FIG. 1 provides a block diagram of a computing device according to an embodiment of the invention.

FIG. 1 shows a computer system 100, according to one aspect of the system and method described herein. Computer system 100 is exemplary of any computer that may execute code to process data. Various modifications and changes may be made to computer system 100 without departing from the broader spirit and scope of the system and method disclosed herein. CPU 101 is connected to bus 102, to which bus is also connected to memory 103, nonvolatile memory 104, display 107, I/O unit 108, and network interface card (NIC) 113. I/O unit 108 may, typically, be connected to an input device 109, such as a keyboard, a touch screen, buttons, etc, mouse or any other suitable graphical input device 110, hard disk (or in some cases other suitable storage, including, but not limited to solid state disk, RAID, network attached storage, storage area network, etc.) 112, one or more cameras 117*a-n*, and real-time clock 111. One or more network cards/interfaces 113*a-n*, some of which may be wireless, may connect to WANs 115 or wireless LANs 116, all of which are connected via Internet 114. Also shown as part of system 100 is power supply unit 105 connected, in this example, to ac supply 106. Not shown are batteries that could be present, and many other devices, including but not limited to special enhanced pointing or navigational devices, such as mice, jog wheels, etc, microphone(s) and speaker(s) and/or headset(s) for recording and or playing back audio, and other modifications that are well known but are not applicable to the specific novel functions of the current system and method disclosed herein.

Figure 2:
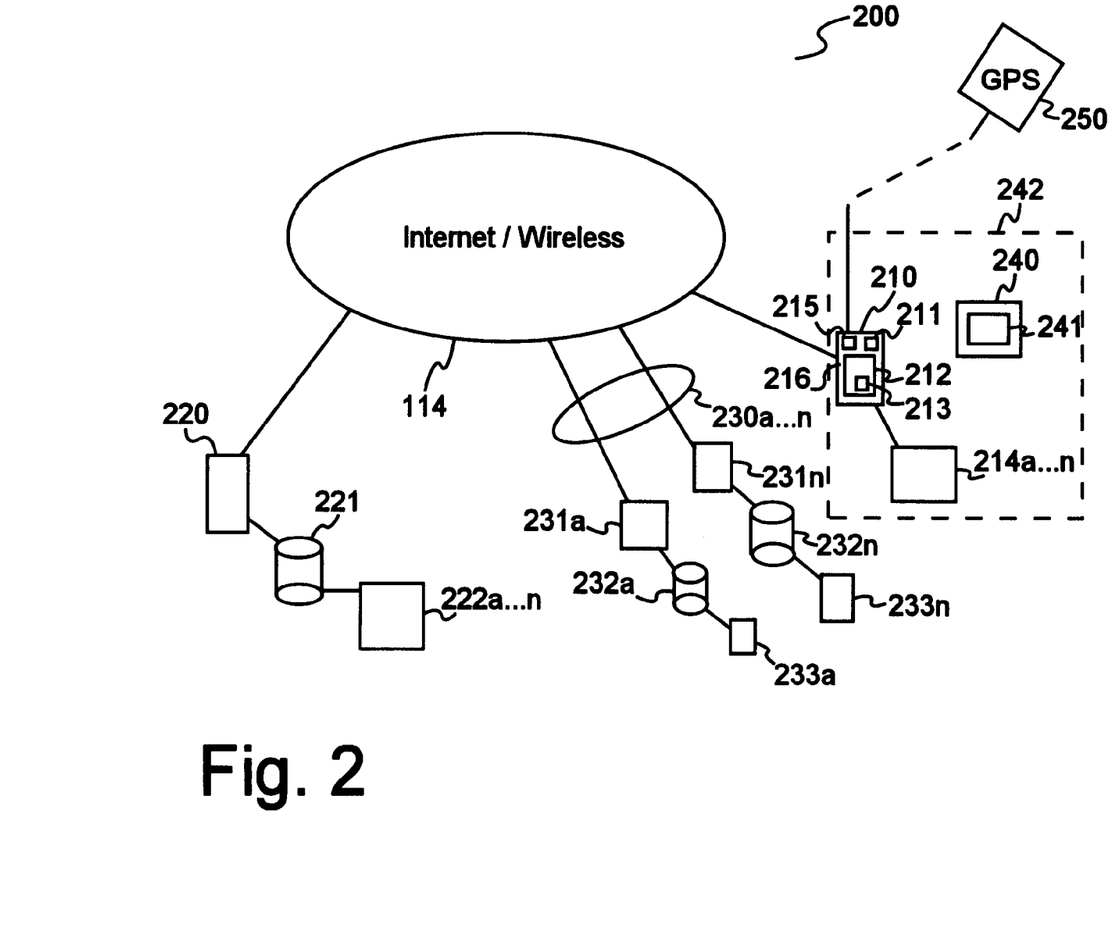
FIG. 2 provides an illustration of a system for using machine-readable indicia to provide additional information and offers to customers, according to an embodiment of the invention.

FIG. 2 shows an overview of an exemplary system 200, according to one aspect of the system and method disclosed herein. The wireless Internet 114 is configured, for the purposes of the system and method disclosed herein, as one conglomerate network, even though it is clear that multiple carriers and other wireless LANs may be offered. An operating center has a server 220 with mass storage 221 and programs 222a-n that are used to provide the service of the system and method disclosed here, which service is described later, in the discussion of FIG. 5. Note that server 220 has a structure similar to the computer discussed in FIG. 1. Multiple systems of different merchants (some of which are participating actively in a promotional program using the system and method disclosed herein) are connected to the Internet via connections 230a-n. Each merchant has its own web service system 231a-n (in some cases, the merchants may have their own web infra structure; in other cases, they may use cloud-based services, etc., which may appear as virtual servers. Servers 213a-n may have a structure similar to the computer discussed in FIG. 1. Each web service system 231 (whether real or virtual) has its own storage 232a-n and its own sets of software 232aa-an through 232na-nn. Also shown is a user with a device 210, which device could be a smart phone with a structure similar to the computing device discussed in FIG. 1. Device 210 contains, in this example, software 214a-n, a camera 211, and in some cases a GPS 215 chip that communicates with GPS satellites 250a-n. Software 214x may be machine-readable code that is stored on a storage media, or downloadable over a network connection, and installed on a mobile computing device 210. The user, in store location 242 in this example, uses device 210 to snap a picture of tag 240, which tag contains a special 1-D or 2-D bar code 241. The user clicks on application 213 contained in device 210 and follows the instructions that appear on the screen, thus pulling up additional data from the merchant in whose store the user is currently shopping or "browsing" (in the physical store).

Figure 3A:
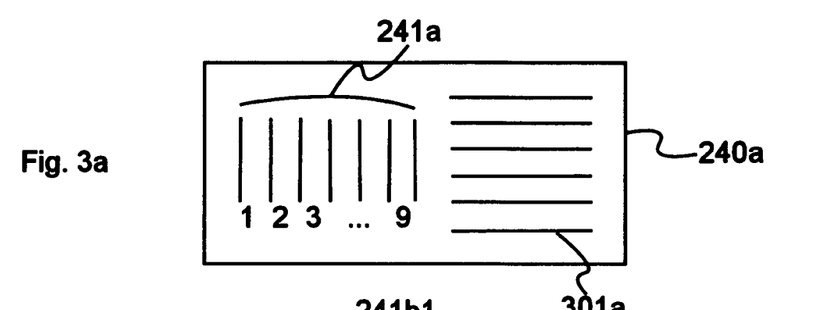
FIG. 3 illustrates a set of possible machine-readable indicia, according to various embodiments of the invention.

FIG. 3 shows different variations of label 240. In FIG. 3a, label 240a has a standard bar code 241a and a legible description 301a. By using either one or multiple of the GPS addresses or the IP address of the local wireless network or cell phone network/WAN network tower triangulation or tower IP address, the system and method disclosed herein is able to determine the location of the user who has taken a picture of label 240 and invoked application 213. The system can then pull up the correct data (item/information/promotion) from the database of the merchant selling the item to give additional information about the selected product and/or special offers. In some cases the main server has the data (item/information/promotion); in other cases, it may refer the user to a merchants website, using cookies or similar tracking methods to enable the operator to get credit for the transaction.

Figure 3B:
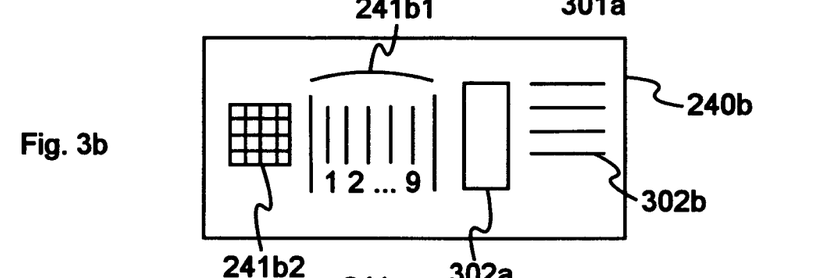

FIG. 3b shows a different label 240b with a 2-D merchant bar code 241b2, as well as the item bar code 241b1. Combined, these two bar codes can deliver all the information necessary to provide the user with item URL/information/promotion for the item in question. Label 240b also carries additional information including legible information 302b and picture or other indicia 302a.

Figure 3C:
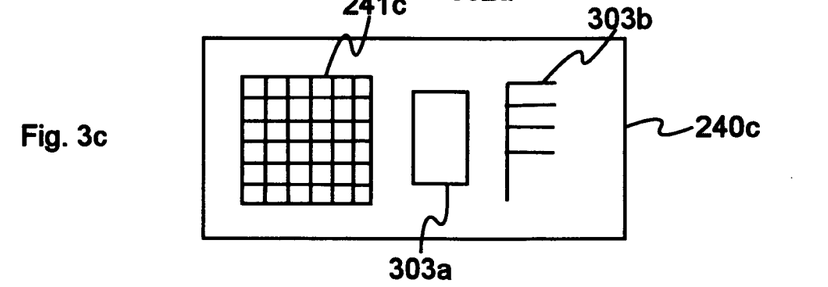

FIG. 3c shows label 240c, which has a high-resolution 2-D bar code 241c, which bar code contains data about the merchant, location, shelf, item information, etc., as well as a link to the appropriate URL. That URL may be, for example, directly embedded in the label, to enable faster data retrieval with less processing. Additional indicia 303a may have a picture or sales promotion on the label and section 303b may have legible text.

In all cases, these labels 240a through 240c could be small LCD screens that could be updated by the merchant's computer, rather than printed labels that need to be manually changed from time to time.

Figure 4:
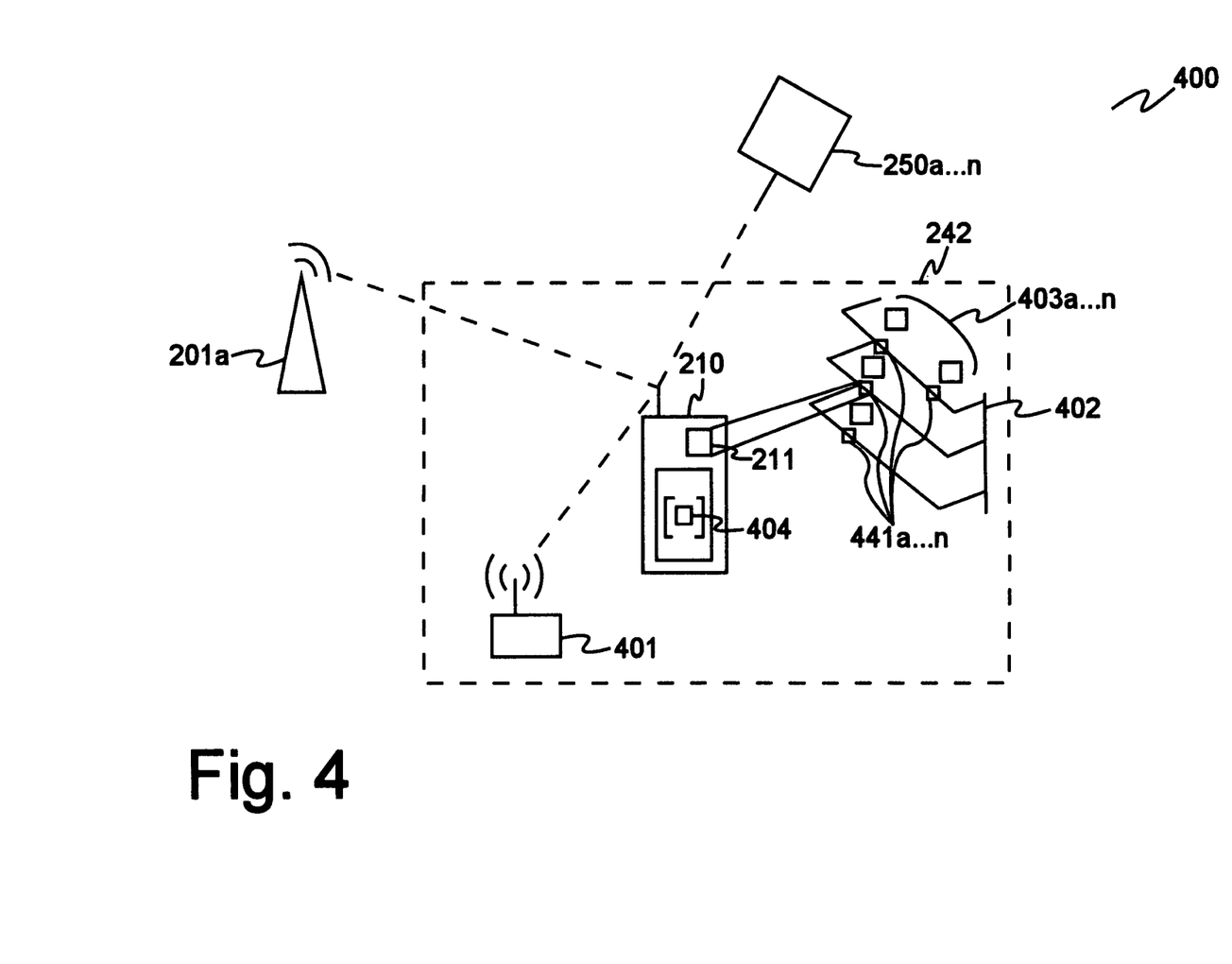
FIG. 4 provides an illustration of an exemplary embodiment of the invention.

FIG. 4 shows a detailed section 400 of the store location 242, mentioned in the discussion of FIG. 2. The user's device 210, with camera 211, scans or takes a picture of a label attached to a shelf 402a in front of merchandise 403a. Labels 441a-n are attached to shelves near items, so they can be scanned or photographed by the user's device. On the screen of device 210 a label appears as image 404. When the image is between the green brackets, the user pushes a button to activate the software of the system and method disclosed herein, or in some cases when the image is held stationary for a predetermined period, for example, 3 seconds, said software is automatically activated. Depending on how the user's device 210 is networked at that moment, the device may then connect to wireless LAN 401, and, use the merchant's network, thereby using the merchant's IP address to determine the identity and location of the merchant. In other cases, device 210 may connect to cell tower 201a or other suitable 3G, 4G, or 5G or other network as available, or it may use GPS satellites 250a-n and determine the merchant accordingly. In some cases, merchants may offer an open network that permits only connection to their website and the service server 220, so the user can obtain information. Such an approach may be most suitable, for example, in locations where no WAN network is available, or the GPS does not work reliably, etc., due to the building materials, such as concrete, metal roofs, etc.

Figure 5:
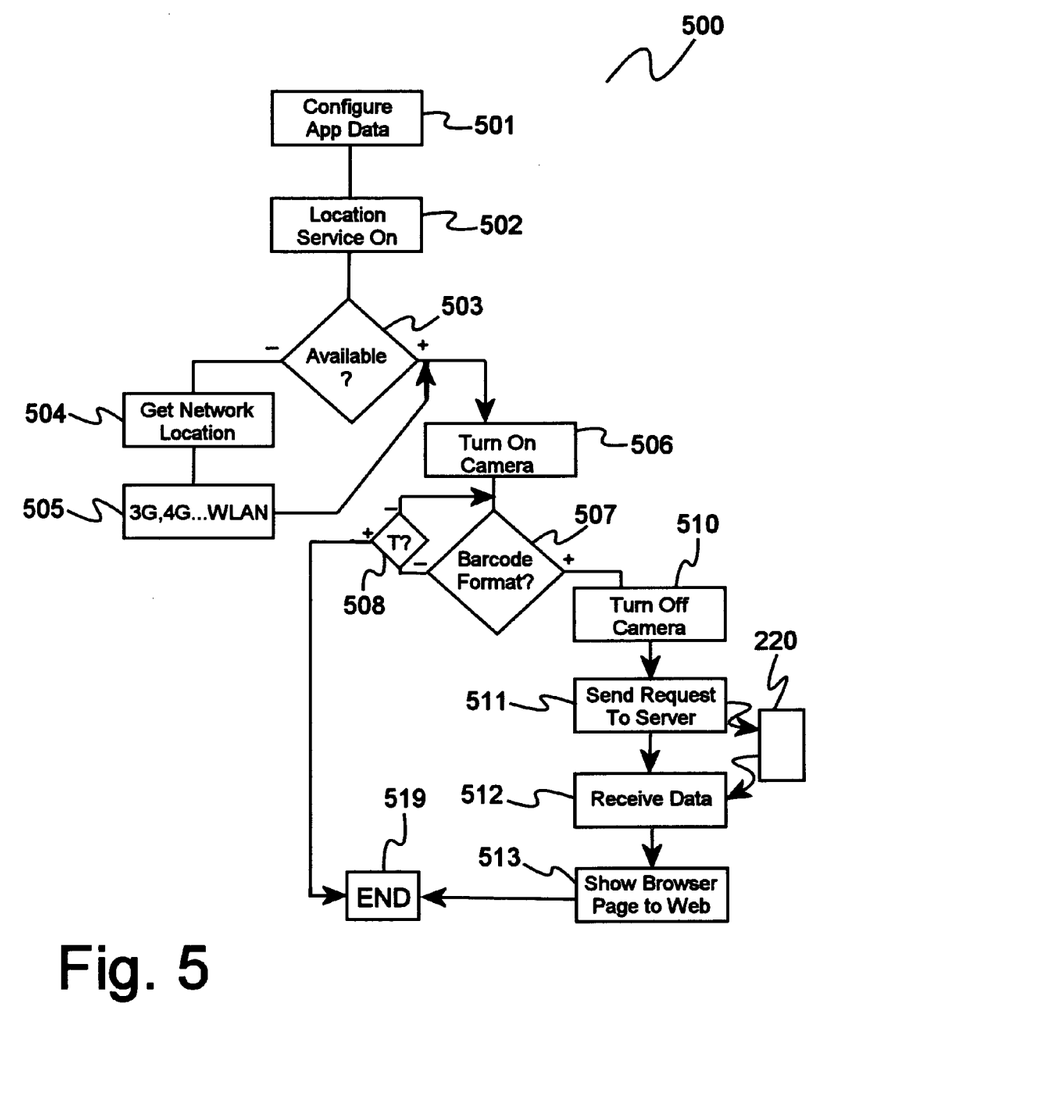
FIG. 5 provides a flow diagram of a method for using machine-readable indicia to provide additional information and offers to customers, according to an embodiment of the invention.

FIG. 5 shows an exemplary process 500 for implementation of the system according to one aspect of the system and method disclosed herein. Most of the code shown here executes on the user's device 210, but depending on the implementation of the system, a lesser or greater amount of code may execute on server 220 or any other suitable server where the software may be installed and accessible to the user's device. In step 501 the application is launched and configures its data. In step 502 it checks that location services are on. In step 503, it checks for availability of location services. If services are not available (−), the process moves to step 504, where the application tries to get a geographic location from a network or, in step 505, by resolving the address of a 3G, 4G, WLAN or other, similar wireless network. The process then loops to step 506, or, if locations services were available when checked in step 503 (+), the process moves directly to step 506. In step 506, the application engages the camera. In step 507, the application checks to see if it finds a bar code. If no bar code is found, the process loops around to step 508, where a timeout occurs, which timeout may be, typically, about 10 seconds. This timeout is inserted to avoid draining the device battery. If the timeout has expired without success, the process ends at step 509. The user can relaunch the application, or in some cases the application may be waiting in an idle screen mode, and the user can turn the camera back on. The process then starts again at step 501, because the user may have changed location. In step 507, if a bar code is found (+), the application then turns off the camera in step 510 and in step 511 sends an image to the server 220, expecting to receive in return a link, which could be a URL, to information or information itself (i.e., XML data), as described earlier (see the discussions of FIGS. 2-4). In step 512, the application receives data from server 220, and in step 513 the application goes to the browser page specified in the received data, on which page, for example, additional product information or promotional material, is displayed on the device screen to the user. Such material may, for example, include a countdown offer, such as, if the item is purchased within the next ten minutes, for example, an additional discount or benefit may incur.

It is clear that the partition between the application on the user's device and the software on the operation center server may be changed in many ways. The server, typically, looks in its database contained in mass storage 221 to find the URL of the merchant and adds a cookie to identify that this visitor has been sent by the system. This approach enables the system operator to participate in the economic benefit of the system and method disclosed herein.

Figure 6:
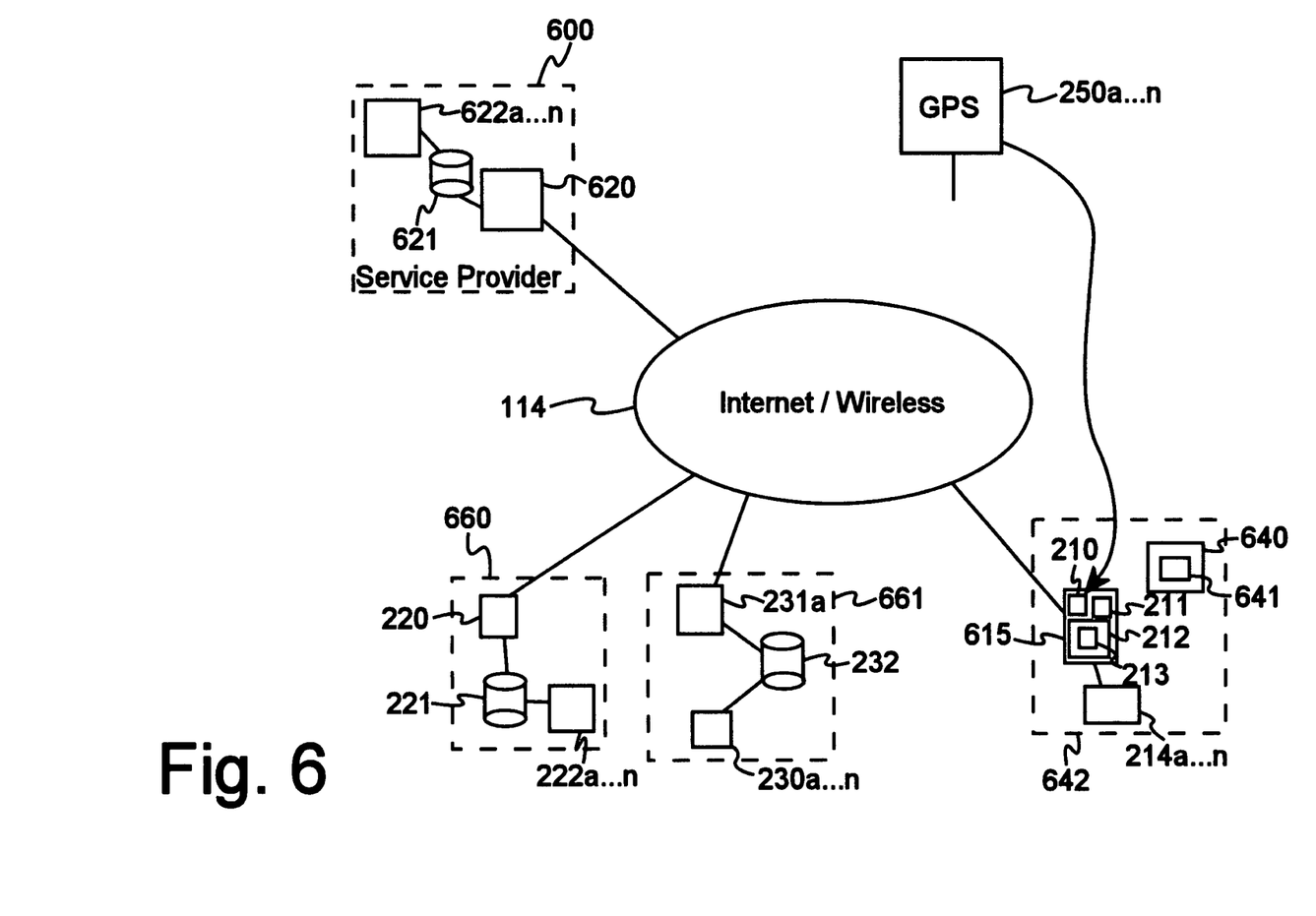
FIG. 6 provides an illustration of a system according to another embodiment of the invention, in which some functions of a system for using machine-readable indicia to provide additional information and offers to customers are provided by a third-party service provider.

FIG. 6 provides an illustration of a preferred embodiment of the invention, in which some functions of a system or method of the invention are carried out "in the cloud" by one or more third-party service providers 600. Service providers, according to the embodiment, are generally equipped with server 620, like server 220 a computer of the type described with reference to FIG. 1, that carries out all or some of the functions described above with reference to server 220. Similarly, database 621 stores data pertaining to merchants, customers, products, and the like, and makes the data available via server 620 to one or more merchants 660, 661 or consumer mobile devices 210. Similarly programs 622*a-n* provide the service of the system and method disclosed herein. According to the embodiment, service provider 600 provides some or all of the functionality carried out, in the embodiments described with reference to FIG. 2, by the merchants that operate servers 220 and 231*a-n*. Similarly, consumers with mobile device 210 can access services according to the invention by scanning or photographing labels 640 containing codes 641 while at a retail outlet 642 associated with one of the merchants, or with one of the merchants' business partners.

As an example of the various ways in which functions described herein may be distributed among one or more service providers 600 and a plurality of merchants 660-661, a service provider acts as an information aggregator for a plurality of merchants, each of which independently operates a server 230*a-n*, 220 according to the invention. By aggregating information from a large number of consumer visits to a variety of retail establishments, service provider 600 is able to provide each merchant with a richer consumer profile and behavioral history than would have been possible if the merchant operated solely using its own acquired data. Similarly, service provider 600 may advantageously facilitate partnerships between merchants in which merchants may share data and cross-promote items (related or not) to enhance consumer information and buying choices in a way that allows the merchants to derive more sales from each visit to a retail establishment. For example, a bank and a food merchant may cooperate to promote the use of label-scanning using mobile applications 214*a-n* in order to make such applications attractive to consumers. If the bank operates branches within the food merchant, such cross-promotions can bring immediate tangible results, but even when they are not collocated mutual support of the respective brands may enhance the utility of mobile device 210 for consumers and may concurrently enhance the respective bank's and food merchant's brands.

In another preferred embodiment, merchants 660-661 may participate in services carried out by the invention without operating any equipment on their own premises. Thus, in this embodiment, there would be no servers 220, 231*a-n*. Rather, merchants could optionally upload product and promotion data (and data pertaining to codes printed or displayed on labels 640) to database 621 in service provider 600, or they could make data in database 221, 232*a-n* available to service provider 600 via a web services interface or other communications means known in the art. In this way, merchants of all sizes could participate in services using the invention without having to maintain separate hardware or separate applications. By uploading (or making accessible) their data, these merchants 660, 661 would be able to use labels 640 through their facilities to add value to consumers' retail experience. For example, when a consumer starts an application 214*a-n* and points the camera 211 in mobile device 210 at label 640 containing code 641, the data captured from the scan or photograph (which as before could include merchant identifiers, product identifiers, detailed location information such as shelf and position identifiers, and data pertaining to promotions associated with the product with regard to which label 640 is posted), is transmitted to service provider 600 and processed by application 622*a-n*. The application 622*a-n* would then gather appropriate data from database 621 and send it to the application 214*a-n* on mobile device 210, thus enabling the consumer to view additional information about the product, promotions related to the product, other products that might be of interest given the context, and so forth. It will be appreciated that the ability of service provider 600 to aggregate data from retail interactions at many merchants' facilities will enable service provider 600 to provide much richer services to merchants than any one merchant could achieve on its own, while also allowing merchants to take advantage of the invention with less up-front investment.

It will be clear to one having ordinary skill in the art of cloud-based merchant systems that such an arrangement of inexpensive coded labels 640 and user-friendly consumer applications 214*a-n* will enable many diverse use cases according to the invention, and that the examples provided herein are merely that: examples.

It is clear that many modifications and variations of the system and method disclosed herein may be made by one skilled in the art without departing from the spirit of the novel art of this disclosure. These modifications and variations do not depart from its broader spirit and scope, and the examples cited here are to be regarded in an illustrative rather than a restrictive sense.

To implement the system and method disclosed herein, a customer must have a web-enabled mobile device, such as a smart phone, with a software application installed, which application can read 1-D and 2-D barcodes, identify the store in which the barcode is read, and modify the software's code-to-URL conversion rules and produce URLs for the appropriate store. Upon detecting a suitable machine readable indicia, the device processor calculates an indicator based on said indicia, and uses said indicator to obtain data relevant to an object related to said machine readable indicia, and then displays part or all of said data relevant to an object related to said machine readable indicia. This retrieved data may be retrieved from a server on a network, such as, for example, the Internet. In some cases, the calculation may be performed on a server reachable through connection to a connection, such as, for example, the Internet.

A number of proprietary and public domain 1-D and 2-D barcode readers are available to satisfy the first requirement of the application.

In some cases, to identify the store, the mobile device may obtain its geographic location information and match it with geographic locations of the stores in a database. If the location match is found, the corresponding store is the one where the barcodes are being read. In other cases, the stores conspicuously present at the entrance and inside a 1-D or 2-D barcode that uniquely identifies the store; for instance, the barcode may encode the store name or other pertinent information. In yet another case, the mobile device may detect a local wireless network and identify the store with a query to this network. Alternatively, a user may type the store name in the software application on the mobile device, speak the name of the store for subsequent voice recognition, or select it from a menu.

To modify the software's code-to-URL conversion rules and produce URLs for the appropriate store the software may use, for each store, a hard-coded or updatable schema for converting the merchandise code into a corresponding URL. In other cases, the software may download the schema for the identified store and use it for converting the merchandise code into a corresponding URL, or alternatively, the software may download a perishable executable code from the local network or the identified store URL, which provide the code-to-URL conversion.

In some cases, a user may bring a friend, family, or social group to a retail store, at which store they may scan a "group" version of the code at the location. All those that do within a certain time period get an offer from the merchant specific to that group. Such an approach may be termed "car pool" loyalty or rewards.

In some cases, the notion of "targeting" specific offers is partially derived by the user ID or the user's device ID, which is authenticated and registered. During the registration, the system gathers demographic detail about the user/user device, which assists in targeting relevant offers. Other data may be collected from subsequent transactions. In some cases, "multi-polar" profiles are used, to account for cases such as, for example, where a parent buys for a child or spouse.

In other cases, the system knows not only relevant data about the user (gender, age, location, etc.) but also the user's prior transaction history. where prior history could include items scanned (for example, a user scanned and got information about a particular product but didn't purchase the product, which information becomes a valuable marketing lead) or actual purchase history (for example, knowing a user buys Crest versus Colgate toothpaste, or knowing that a user purchased a Sony LCD, the system could deliver an offer for HDMI cables or a Blu-Ray DVD player, rebate details or extended warranty offer), as well as, for example, including but not limited to, one or more of time-of-day, location, prior and following location to transaction, day of week, date, etc.

In further cases, location-based services can be used for verified "check in" at a store. For example, a user can scan a code when entering Whole Foods, and thence the system has available who the user is, where he is, what merchant type (grocery) and branch, when (time and date). All the previous are valuable information that could enable time-sensitive offers. For example, if Whole Foods knows they have excess eggs, the system could retrieve data from their inventory management/ERP system to offer consumers eggs, in particular to those who have bought them in the past. Also, when scanning the code, referencing prior transaction/purchase history enables additional targeting. For example, entering Whole Foods, a user scans a code, the system looks at the user's history and, knowing that the user buys Coke versus Pepsi, the system could deliver a targeted ad for one of those or a related beverage product.

It is clear that many more modifications and variations of the system and method disclosed herein may be made by one skilled in the art without departing from the spirit of the novel art of this disclosure. These modifications and variations do not depart from its broader spirit and scope, and the examples cited here are to be regarded in an illustrative rather than a restrictive sense.

The invention claimed is:

1. A system for using machine-readable indicia to provide additional information and offers to potential customers, the system comprising:
   an item containing machine-readable indicia and posted near a product for sale;
   a network-connected server adapted to receive coded information from devices, the coded information obtained from the machine-readable indicia;
   a database coupled to the server and containing data pertaining to products; and
   a software application executing on the server for processing the coded information;
   wherein, on receiving the coded information from a mobile device, the server provides the coded information to the software application, and the software application determines from the coded information a location from which the information was obtained and a product to which the coded information pertains; and
   wherein, based at least in part on the location and product information obtained, the application obtains additional data from the database and sends it to the mobile device from which the coded information was received.

2. A machine-readable code, on a storage medium, or downloadable over a network connection, to be installed on a mobile computing device, said device having a user display, a camera, non-volatile storage, location information and a network connection,
   wherein, upon detecting a suitable machine readable indicia,
   the device calculates an indicator based on said indicia, the indicator comprising at least information about the location of the detected machine readable indicia, and
   the device uses said indicator to obtain data relevant to an object related to said machine-readable indicia, and then displays part or all of said data relevant to an object located near to said machine-readable indicia.

3. The code of claim 2, wherein the information about the location of the machine readable indicia is used by the device to present location-specific results.

4. The code of claim 3, wherein the data relevant to an object related to said machine readable indicia is retrieved from a server on a network.

5. The code of claim 2, wherein previous related user chronological information is added to the indicator, allowing the device to present group and crowd specific results.

6. The code of claim 5, wherein said network is the internet.

7. The code of claim 2, wherein the calculation is performed on a server reachable through said network connection.

8. The code of claim 7, wherein said network is the internet.

9. A method for providing information to a user, the method comprising the steps of: taking a picture, with a mobile device having a display, a camera and a network interface, of a machine-readable indicia located near to a product for sale; calculating from the machine-readable indicia an indicator, the indicator comprising at least information about the location of the detected machine readable indicia; and using the indicator to retrieve relevant data and at least display part of that data to a user.

10. The method of claim 9, wherein the data displayed is specific to the location of the device at the time of retrieval.

11. The method of claim 9, wherein the calculation is performed on a server reachable through a network coupled to said network interface.

12. The method of claim 9, wherein said data is retrieved from a server reachable through a network coupled to said network interface.

13. The method of claim 9, wherein the data displayed is an offer that is at least in part derived from an identifier associated with the mobile device.

14. The method of claim 13, wherein the identifier is used to retrieve demographic details about a user, the demographic data based at least in part on a registration event associated with the device.

* * * * *